United States Patent [19]
Pedicini

[11] Patent Number: 5,920,179
[45] Date of Patent: Jul. 6, 1999

[54] SYSTEM AND METHOD FOR BALANCING CHARGE CYCLES FOR BATTERIES OR MULTIPLE-CELL BATTERY PACKS

[75] Inventor: Christopher S. Pedicini, Canton, Ga.

[73] Assignee: AER Energy Resources, Inc., Smyrna, Ga.

[21] Appl. No.: 08/851,419

[22] Filed: May 5, 1997

[51] Int. Cl.⁶ ........................................... H02J 7/00
[52] U.S. Cl. .................. 320/122; 320/160; 320/162
[58] Field of Search .................... 320/128, 138, 320/136, 134, 160, 122, 118, 119

[56] References Cited

U.S. PATENT DOCUMENTS

| | | |
|---|---|---|
| 3,947,743 | 3/1976 | Mabuchi et al. |
| 4,719,401 | 1/1988 | Altmejd. |
| 4,792,743 | 12/1988 | Tsujino et al. |
| 4,849,682 | 7/1989 | Bauer et al. |
| 5,153,496 | 10/1992 | LaForge. |
| 5,283,512 | 2/1994 | Stadnick et al. |
| 5,387,857 | 2/1995 | Honda et al. |
| 5,438,250 | 8/1995 | Retzlaff. |
| 5,498,950 | 3/1996 | Ouwerkerk. |
| 5,504,415 | 4/1996 | Podrazhansky et al. |
| 5,666,040 | 9/1997 | Borbeau .................. 320/118 |
| 5,675,233 | 10/1997 | Kaneko et al. ............. 320/122 |

Primary Examiner—Peter S. Wong
Assistant Examiner—Gregory J. Toatley, Jr.
Attorney, Agent, or Firm—Jones & Askew, LLP

[57] ABSTRACT

A charging system and method are disclosed that provide balanced charge cycles for batteries or multiple-cell battery packs by using a controller, a charging source gate, multiple adjustable shunting devices and multiple charge monitors. During a virgin charge cycle, the controller adjusts each of the adjustable shunting devices to provide a maximum charging current, opens the charging source gate, and then monitors the charge level of each of the battery cells. When the voltage potential of one of the battery cells reaches a threshold value, the charge source gate is closed to disable the charging current, and the fully charged battery cell is identified. The controller then determines a shunt value for adjusting the adjustable shunting device connected to the fully charged battery cell and uses this shunt value on the next charge cycle. Each subsequent charge cycle results in a different battery cell becoming fully charged and then the recalculation of a shunt value. The overall effect is to allow each battery or each cell of a battery pack to be periodically fully charged, regardless of the variations in the charging, discharging and efficiency characteristics of the batteries or battery cells.

25 Claims, 3 Drawing Sheets

SYSTEM AND METHOD FOR BALANCING CHARGE CYCLES FOR BATTERIES OR MULTIPLE-CELL BATTERY PACKS

TECHNICAL FIELD

The present invention relates to battery charging methods and systems and, more particularly, relates to balancing the charge cycles for a multiple-cell battery pack without adversely impacting the life or cost of the battery pack.

BACKGROUND OF THE INVENTION

Rechargeable battery packs have become a defacto standard for use with portable consumer electronic devices such as computers, cellular telephones, cordless phones, power tools, and the like. Consequently, a significant amount of engineering effort focuses on the development of new and improved methods and systems for charging battery packs.

One goal of these engineering efforts is to develop charging algorithms that alleviate the memory cycle effect common to many battery technology types such as AqZn, NiZn and Lithium Ion. The memory cycle effect is the tendency for a battery cell to remember the maximum voltage potential obtained during previous charge cycles and then to limit future charges to this value. Thus, if a battery cell is undercharged (or partially charged) for several charge cycles, the battery cell will develop a resistance to being fully charged during future charge cycles. This tendency results in decreasing the charge life (time between charges) of a battery cell and hence, decreases the charge life of a battery pack that contains that battery cell. In addition, the performance of battery cells tends to diminish with the number of charge cycles the battery cells experience. Because a decrease in the charge life of a battery cell will require the battery pack to be charged more frequently, the overall life of the battery pack will also be reduced.

Another goal of these engineering efforts is to develop charging algorithms that quickly and completely charge a multiple-cell battery pack without overcharging the individual battery cells. Once a battery cell has been fully charged, a continuous source of current may damage the structure of the battery cell. Thus, similar to undercharging a battery cell, overcharging a battery cell may also significantly affect the life of a battery cell and the battery pack.

Thus, overcharging and/or undercharging cells within a battery pack may result in decreasing the overall life span of a battery pack. Furthermore, a significant portion of the cost of portable electronic devices can be attributed to the cost of the battery pack. Therefore, a need exists to maximize the life span of rechargeable battery packs.

Generally, battery packs for portable electronic devices include several battery cells connected in series. Ideally, each of the battery cells within a battery pack will have similar charging, discharging and efficiency characteristics. However, this ideal scenario is not easily achieved. In order to build these ideal battery packs, manufacturers must expend considerable time and expense to measure and characterize several battery cells and then group together the battery cells with similar characteristics. This results in a dramatic increase in the production cost of the battery packs. Thus, more often than not, a battery pack contains multiple battery cells with each battery cell having different charging, discharging and efficiency characteristics. This tendency results in exaggerating the previously described problems due to overcharging and undercharging of the battery cells. For instance, fully charging one battery cell in a battery pack may result in overcharging one or more of the other battery cells in the battery pack. Likewise, ending a charge cycle when only one battery cell is fully charged may result in undercharging one or more of the other battery cells in the battery pack. Therefore, there is a need for a system to provide a balanced charging cycle that accommodates multiple battery cells having varying charging, discharging and efficiency characteristics.

Several techniques have been developed to address the problems involved in charging multiple-cell battery packs. One of these techniques is described in U.S. Pat. No. 5,283,512 to Stadnick et al. Stadnick describes a system for charging multiple batteries or battery cells connected in series. This system charges each of the battery cells at a full current rate until one battery cell reaches a maximum threshold voltage (i.e., is fully charged). The full current rate is then turned off and a low current rate, referred to in the art as a trickle charge, is started. As each battery cell becomes fully charged during the trickle charge, the battery cell is removed from the charge path. This is accomplished by shunting the current of the trickle charge around the fully charged battery cell.

The system described in Stadnick has at least two disadvantages. First, in order to avoid damaging the battery cells, the trickle charge must be significantly less than the full current rate. This requires a shunting device that can dissipate the difference between the full current rate and the trickle charge current rate. Additionally, dissipating this amount of current is wasteful and results in generating a significant amount of heat. This heat must be dissipated by the use of heat sinks or the like. A shunting device that can handle this amount of current is typically expensive compared to the other components in the charging circuitry. Second, the system described in Stadnick can result in significantly lengthening the charge cycle time. For example, if one battery cell in the battery pack reaches the maximum threshold voltage much earlier than the other battery cells, the amount of time required to charge the remaining battery cells under a trickle charge may be significant. Therefore, there exists a need for a charging system and method that balances the charge of a multiple-cell battery pack without increasing the cost of the battery pack by requiring a shunting device to dissipate a large amount of current. Furthermore, there exist a need for a balanced charging system that does not significantly increase the charge cycle time.

A second technique for charging multiple-cell battery packs is described in U.S. Pat. No. 5,504,415 to Podrazhansky et al. Podrazhansky describes a method of charging multiple batteries or battery cells connected in series. This system utilizes a thermistor to detect when a battery cell is fully charged or is approaching a fully charged state. Generally, by monitoring the thermal characteristics of a battery cell, a determination of when the battery cell has been fully charged can be made. For instance, the temperature may change at one rate while the battery cell is charging and then at a different rate once the battery cell has been fully charged. Thus, as a particular battery or battery cell approaches the fully charged state, the charging current is shunted around the battery or battery cell to prevent overcharging.

The system described in Podrazhansky has at least two disadvantages. First, the use of a thermistor for each battery cell in the battery pack increases the cost of manufacturing the battery pack. Also, the thermistors must be carefully placed so as not to be affected by the temperature of surrounding cells or by heat generated by components in the attached equipment. For instance, in a cellular mobile telephone, the design process must take into consideration the location of heat generating components, such as a power amplifier, in order to prevent degrading the accuracy of the thermistors. Second, Podrazhansky teaches completely shunting the current around a battery or cell that approaches the fully charged state. Similar to Stadnick, this results in increasing the cost of the shunting device. Therefore, there is a need for a balanced charging system that does not impact the design and cost of attached devices or the battery pack.

A third technique for charging multiple-cell battery packs is described in U.S. Pat. No. 5,498,950 to Ouwerkerk. Ouwerkerk describes a method to balance the charge of multiple batteries or battery cells connected in series. This method operates by sequentially measuring the voltage level of each battery or battery cell. The batteries or battery cells having the lowest voltage, relative to the other batteries or battery cells, are then charged. After this charge cycle, the batteries or battery cells are again sequentially measured to determine which batteries or battery cells will be charged in the next charge cycle.

The system described in Ouwerkerk has at least one disadvantage. For each charge cycle, only a portion of the batteries or battery cells are selected to be charged. Thus, multiple charge cycles must be performed in order to fully change an entire battery pack. This results in significantly increasing the charge cycle time for the battery pack.

Thus, there exists a need for a balanced charging system that does not significantly increase the charge cycle time for a multiple-cell battery pack. There also exists a need for a balanced charging system that does not require expensive shunting devices for diverting or dissipating large amounts of charging current. There also exists a need for a balanced charging system that does not impact the design and cost of the attached equipment. Furthermore, there exists a need for a balanced charging system that, on the average, charges each cell of a multiple-cell battery pack to its maximum value and thereby does not adversely affect the life cycle of the battery pack.

SUMMARY OF THE INVENTION

The present invention provides a solution for the above described problems in the art by providing balanced charge cycles for multiple-cell battery packs without adversely impacting the life span of or cost of the battery pack or any attached equipment. The present invention balances the charge cycles of a multiple-cell battery pack by: (a) initiating a charge cycle for simultaneously charging a plurality of battery cells at an initial charging rate; (b) detecting a triggering battery cell, the triggering battery cell being the first battery cell to be charged to a threshold level; (c) terminating the charge cycle; and (d) throughout the next charge cycle, reducing the charging rate for charging the triggering battery cell by a selected amount. Over multiple battery charge cycles, each cell has the opportunity to be fully charged. Thus, advantageously, the technique of the present invention maximizes the life span of the rechargeable batteries or multiple-cell battery packs.

In one embodiment of the present invention, the operation of an active charge cycle is based on the results of the previous charge cycle. This battery charging system includes a controller, a current source gate, adjustable shunting devices, and charge monitors, one shunting device and monitor for each battery cell. The controller opens and closes the current source gate allowing or preventing the flow of a charge current. The controller also adjusts each of the adjustable shunting devices to establish the amount of charging current that is output to or shunted away from its associated battery cell. The controller monitors the charge level of each battery cell through the charge monitors.

In performing the very first charge cycle for a new battery pack ("virgin charge cycle"), the controller adjusts each of the shunting devices to provide a maximum charge output to the connected battery cell. The controller then enables the input of the charging current through the charging source gate. The charging current remains enabled until the controller detects that a triggering battery cell has been charged to a threshold value. In response to detecting this condition, the controller disables the charging current by closing the charging source gate. Next, the controller determines a shunt value for adjusting the shunting device connected to the triggering battery cell. One method that may be used to determine the shunt value is to select a shunt value that limits the shunt output of the adjustable shunting devices to approximately 1% to 5% of the maximum charge output current. This limitation allows the use of inexpensive shunting devices. Therefore, the present invention advantageously does not impact the cost of the batteries or multiple-cell battery packs.

In performing subsequent charge cycles, or shunted charge cycles, the controller adjusts the shunting device connected to the triggering battery cell in accordance with the determined shunt value. In addition, the controller adjusts each of the shunting devices connected to a non-triggering battery cell in order to maximize the charge output current. The controller then enables the charging current by opening the charging source gate and proceeds to monitor the battery cells during the shunted charge cycle. Each charge cycle of the battery pack is limited to the time required to charge one battery cell to the maximum threshold level when charging at the full current rate. Therefore, an advantage of the present invention is the ability to provide balanced charging cycles without increasing the charge cycle time.

In another embodiment of the present invention, the operation of the current charge cycle is based on each of the previous charge cycles since a last reset condition occurred. The battery charging system includes a controller with a memory storage device, a current source gate, adjustable shunting devices, and charge monitors, one shunting device and charge monitor for each battery cell. The controller operates to open and close the current source gate when starting or terminating a charge cycle. When the controller opens the current source gate, a charge current is allowed to flow to each of the adjustable shunting devices. Each adjustable shunting device is dedicated to a single battery cell and has one output connected to a terminal of that battery cell. A second output of each adjustable shunting device is fed back to the current source. The charge current that is received by each adjustable shunting device is divided between these two outputs based on a shunt value. The controller maintains a unique shunt value variable, in the memory storage device, for each adjustable shunting device. The controller either loads the shunt value into each adjustable shunt device or generates a signal, representative of the shunt value, to be sent to each adjustable shunting devices. This loaded shunt value or signal establishes the amount of charging current that is output to the battery cell or shunted by the adjustable shunting device. Each of the charge monitors are connected across the positive and negative terminals of one of the battery cells. The controller uses the charger monitors to determine the voltage potential of each battery cell.

The charging system of this embodiment operates by: (a) setting a shunt value variable stored in the memory storage device, for each shunting device, to a minimum value allowing a maximum charge current; (b) adjusting each of the shunting devices in accordance with its current shunt value variable; (c) enabling the input of the charging current by opening the charging source gate; (d) identifying a triggering battery cell by monitoring each of the charge monitors until the voltage potential of one of the battery cells reaches a threshold value; (e) in response to identifying a triggering battery cell, disabling the charging current by closing the charging source gate; (f) determining a shunt value for adjusting the shunting device connected to the triggering battery cell; (g) storing the newly determined shunt value into the shunt value variable for the triggering battery cell; and (h) starting the next charge cycle at step (b).

In addition, the charging system of this embodiment may reset the shunt value variables to the minimum value when one of the shunt value variables reaches a maximum value. The step of determining a shunt value can be accomplished in the method described above or alternatively, by simply incrementing the shunt value by a predetermined amount.

Advantageously, these embodiments of the present invention ensure that each battery cell in a battery pack has the opportunity to be fully charged at least once every N cycles, where N is the number of battery cells in the battery pack. This occurs even when the battery cells have significantly different charging, discharging and efficiency characteristics.

The charging system of each of these embodiments may conform to several configurations. First, the controller, the charging source gate, the adjustable shunting devices, and the charger monitors may all be incorporated into a single, multiple-cell battery pack. Advantageously, this configuration, in either of the provided embodiments, can be accomplished without impacting the cost or design of the attached equipment. Alternatively, any or all of these components can exist external to the battery pack. In addition, the battery cells of the battery pack may be manufactured according to various technologies such as NiMH, NiCd, Zinc Air, metal air, or Lithium Ion.

The charging systems and methods of each of these embodiments may be used for charging individual battery cells, individual battery cells connected together as a multiple-cell battery pack, individual batteries consisting of one or more cells each, or individual batteries consisting of one or more cells and connected together as a multiple-battery battery pack. The term "battery unit" used herein refers to a single battery cell or a single battery consisting of one or more cells.

These and other aspects, features, and advantages of the present invention will be more clearly understood and appreciated from a review of the following detailed description of the present invention and possible embodiments thereof, and by reference to the appended drawings and claims.

DETAILED DESCRIPTION

The present invention is directed toward a system and a method for balancing the charge cycles of a multiple-cell battery pack or multiple batteries without adversely impacting the life of the battery pack. Briefly described, the present invention modifies each charge cycle based on the performance of the battery cells during previous charge cycles. In one embodiment, information obtained from the last charge cycle is used to modify the active charge cycle. In another embodiment, information obtained from one or more previous charge cycles is used as the basis for modifying the active charge cycle.

More specifically, the present invention balances the charge cycles of a multiple-cell battery pack by monitoring the voltage level of each battery cell during a charge cycle. When one of the battery cells reaches a maximum threshold value, the charge cycle is terminated. The identity of the battery cell that reached the maximum threshold value is recorded. During the next charge cycle, a small portion of current is shunted around this battery cell in order to allow an alternate battery cell to reach the maximum threshold value. Thus, on a periodic basis, each battery cell is fully charged. Furthermore, because the current is shunted around the battery cell during the entire charge cycle, the present invention provides a balanced charge cycle throughout the entire charge cycle. The prior art solutions only attempt to balance the charge cycle at the end, therefore requiring a large amount of current to be shunted around the battery cells.

Turning now to the drawings, in which like numerals refer to like parts throughout the several views, embodiments of the present invention will be described.

Figure 1:
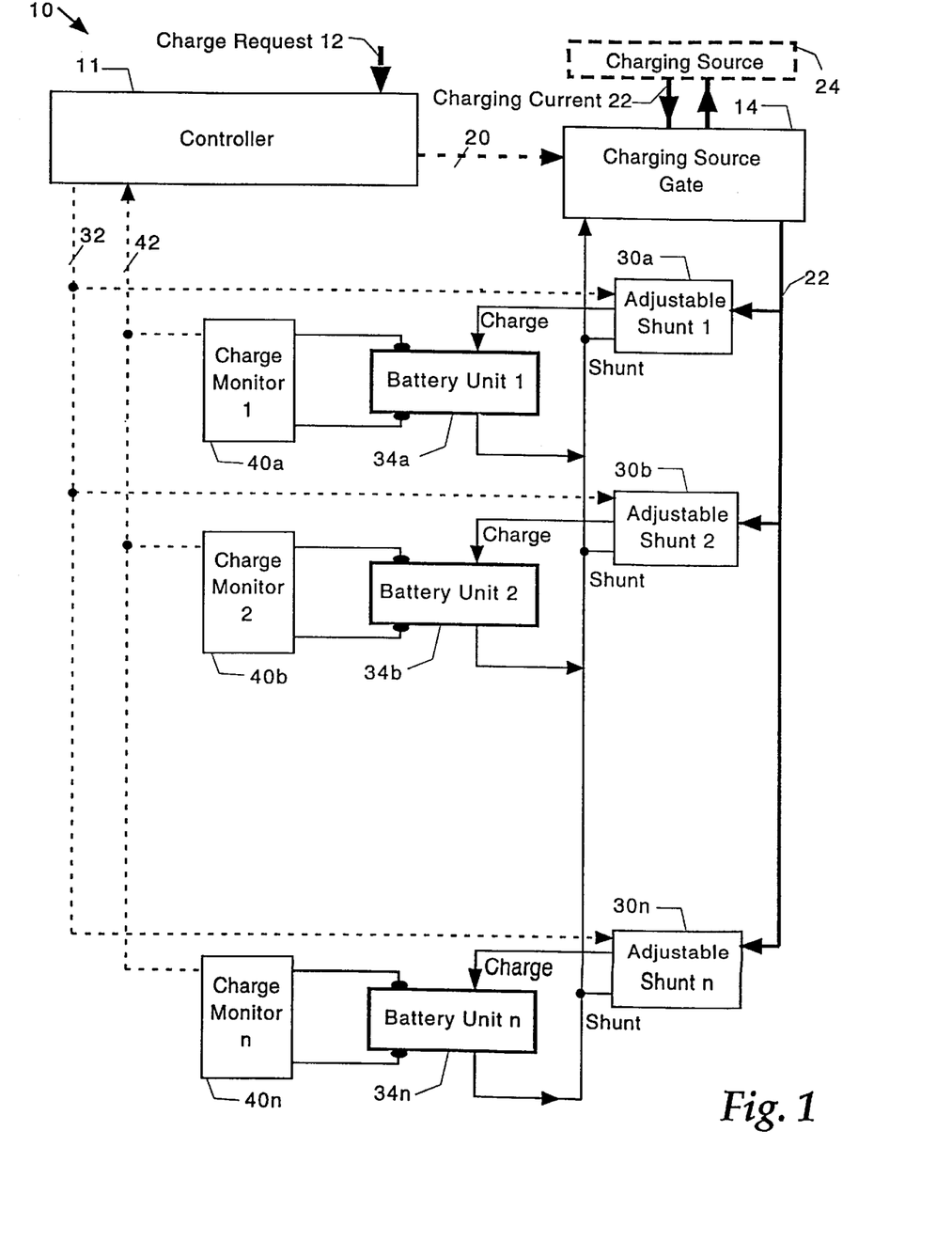
FIG. 1 is a block diagram illustrating an exemplary environment for the charging system of the present invention.

FIG. 1 is a block diagram illustrating an exemplary environment for the charging system 10 of the present invention. A controller 11 is used to control and monitor each charge cycle. In response to receiving a charge request 12, the controller initiates a charge cycle. The charge request 12 may be provided from several mechanisms or sources. For instance, in one embodiment, the charge request 12 may be generated by the controller 11 upon detecting that the voltage potential of one or more battery cells has dropped below a minimum threshold value. In another embodiment, an external source may provide a control signal to indicate to the controller 11 that a new charge cycle is being requested. In yet another embodiment, the charge request 12 signal may be generated as the result of attaching a multiple-cell battery pack to the charging system 10.

The charge system 10 of FIG. 1 also includes a charging source gate 14. The controller 11 operates the charging source gate 14 by means of a gate control 20. By applying an appropriate signal onto the gate control 20, the controller causes the charging source gate 14 to open. When the charging source gate 14 is open, a charging current 22 flows from a charging source 24. Similarly, the controller 11 can close the charging source gate 14, preventing the charging current 22 from flowing.

Multiple adjustable shunting devices (30a, 30b, ... 30n) receive a portion of the charging current 22. The controller 11 individually adjusts each of the adjustable shunting devices 30a–30n by means of a shunt control bus 32. Each adjustable shunt device 30a–30n receives a portion of the charging current 22 and divides the charging current between two outputs (charge output and shunt output). The adjustable shunting device divides the charging current in accordance with a control signal received over the shunt control bus 32. The charge output of the adjustable shunt devices 30a–30n is provided to one terminal of a battery cell (34a, 34b, ... 34n). The shunt output of the adjustable shunt devices 30a–30n is provided back to the charging source 24.

Multiple charge monitors (40*a*, 40*b*, . . . 40*n*) are used to monitor the charge level of each battery cell. The charge monitors 40*a*–40*n* provide status information to the controller 11 through a charge monitor bus 42. In one embodiment, the controller 11 may read each charge monitor 40*a*–40*n* and compare the charge level of the battery cells with a maximum threshold. In an alternative embodiment, each charge monitor 40*a*–40*n* may compare the charge level of a connected battery cell 34*a*–34*n* with a maximum threshold. When a charge monitor detects that the connected battery cell has exceeded the maximum threshold, the charge monitor may send a status signal to the controller indicating that the charge level of the connected battery cell should trigger the controller to terminate the charge cycle.

In one embodiment, the adjustable shunt devices 30*a*–30*n*, the charge monitors 40*a*–40*n*, the controller 11 and the charging source gate 14 can all be integrated into a battery pack. In another embodiment, the controller 11 and or the charging source gate 14 can be external to the battery pack. In yet another embodiment, all of these devices may be external to the battery pack. Furthermore, embodiments of the present invention may be used to charge multiple batteries or battery cells that are not connected to each other as well as those that are connected together in series or parallel.

Single Cycle Memory Embodiment

Figure 2:
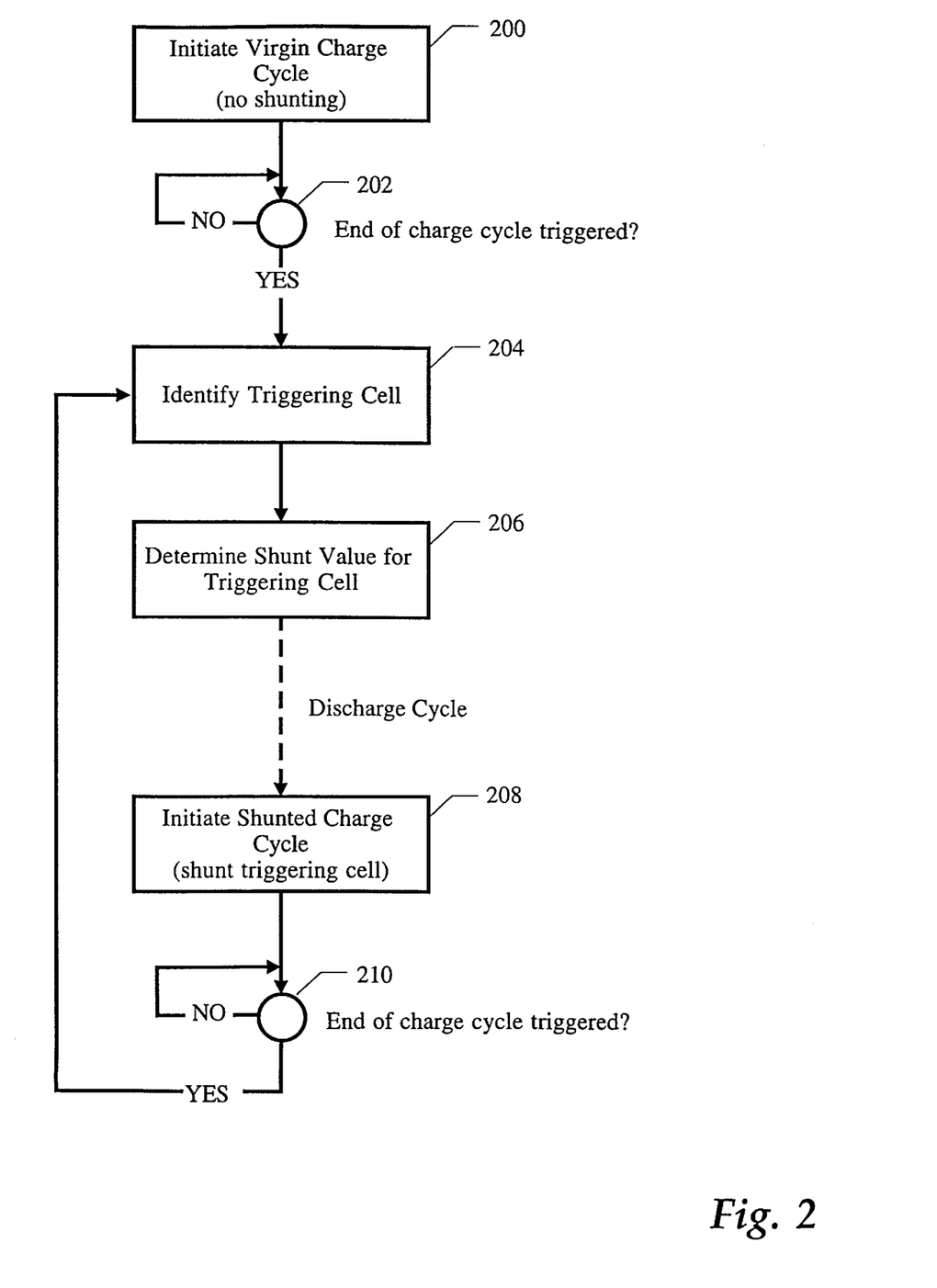
FIG. 2 is a flow diagram illustrating the steps involved in performing a single cycle memory embodiment of the present invention.

FIG. 2 is a flow diagram illustrating the steps involved in performing a single cycle memory embodiment of the present invention. The illustrated steps represent the processes that the controller 11 of FIG. 1 may perform in charging a multiple-cell battery pack in accordance with this embodiment. In the single cycle memory embodiment, the operation of a charge cycle is based on the results of the last charge cycle. By referencing both FIGS. 1 and 2, this embodiment of the present invention is described.

Beginning at step 200, the controller 11 initiates a first or virgin charge cycle for a multiple-cell battery pack. In the virgin charge cycle, no information is available concerning previous charge cycles. Therefore, each of the adjustable shunt devices 30*a*–30*n* will provide maximum current at the charge outputs. The controller 11 initiates the virgin charge cycle by opening the charging source gate 14. At step 202, the controller 11 monitors the charge level of each battery cell through the charge monitor devices 40*a*–40*n*. When the charge level of one of the battery cells 34*a*–34*n* reaches a maximum threshold value, the virgin charge cycle is terminated and processing continues at step 204.

At step 204, the controller 11 identifies the particular battery cell that triggered the termination of the charge cycle ("triggering battery cell"). One method to accomplish this is to query the charge monitors to determine the charge level of the connected battery cell. The battery cell with the largest charge value is the triggering battery cell. At step 206, a shunt value is determined for the triggering battery cell. The shunt value represents the amount by which the charging current will be reduced for the triggering cell during the next charge cycle. The shunt value may be determined in a variety of methods and the present invention should not be limited to any specific method. For illustrative purposes, several possible methods are described. One method to determine the shunt value is to compare the charge level of the triggering battery cell with the charge level of at least one other battery cell. The shunt value can then be calculated to guarantee that the triggering battery cell will not charge at a faster rate than at least one other battery cell. This method assures that the triggering battery on this charge cycle will not invoke the termination of the next charge cycle. Alternatively, shunt values between 1% and 5% of the full current rate can be selected in either a deterministic manner or randomly.

After determining the shunt value for the triggering cell, the battery pack passes through a discharge cycle prior to initiating a shunted charge cycle at step 208. Step 208 is entered as the result of a charge request 12. At step 208, the controller 11 applies the shunt value, determined in step 206, to the adjustable shunting device of the triggering battery cell and initiates a shunted charge cycle by opening the charging source gate 14. The charging current is applied fully to all battery cells except the triggering battery cell, from which a portion of the charging current is shunted according to the shunt value. At step 210, the controller 11 monitors the charge level of each battery cell during the shunted charge cycle through the charge monitor devices 40*a*–40*n*. When the charge level of one of the battery cells 34*a*–34*n* reaches a maximum threshold value, the controller 11 terminates the shunted charge cycle and processing returns to step 204.

Returning to step 204, the controller 11 identifies the new battery cell that triggered the termination of the charge cycle. At step 206, a new shunt value is determined for the new triggering battery cell and the controller 11 waits for the next charge request 12. Upon receiving the next charge request 12, the controller 11 resets each of the adjustable shunt devices so that the maximum current is passed to the battery cells (including the battery cell partially shunted in the previous charge cycle) through the charge output. The controller 11 also adjusts the adjustable shunt device connected to the new triggering battery cell in accordance with the newly determined shunt value. This process continues for each subsequent shunted charge cycle.

It should be apparent to the reader that this embodiment of the present invention provides a balanced charging method for a multiple-cell battery pack. Furthermore, by limiting the shunting device to dissipate 1% to 5% of the full current charging rate during the entire charging cycle, an inexpensive shunting device can be used, making the battery pack more economically feasible. In addition, the length of each charge cycle is limited to the charge cycle of the triggering battery cell at a full rate charge. Thus, it should be apparent that this embodiment does not increase the charge cycle time.

Multiple Cycle Memory Embodiment

Figure 3:
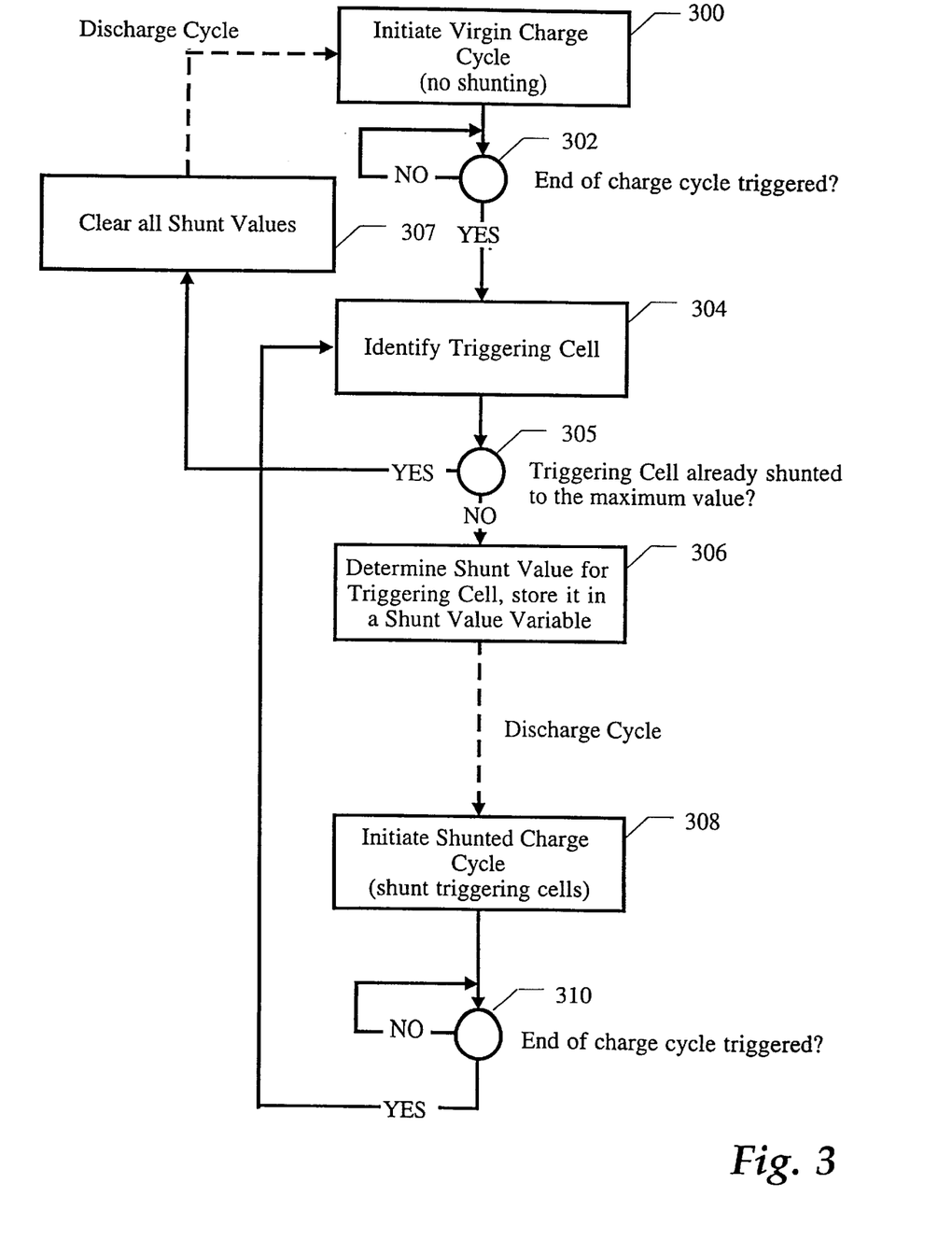
FIG. 3 is a flow diagram illustrating the steps involved in performing a multiple cycle memory embodiment of the present invention.

FIG. 3 is a flow diagram illustrating the steps involved in performing a multiple cycle memory embodiment of the present invention. The illustrated steps represent the processes that the controller 11 of FIG. 1 may perform in charging a multiple-cell battery pack in accordance with this embodiment. In the multiple cycle memory embodiment, the operation of a charge cycle is based on each of the previous charge cycles since the last reset condition occurred. By referencing both FIGS. 1 and 3, this embodiment of the present invention is described.

Beginning at step 300, the controller 11 initiates a first or virgin charge cycle for a multiple-cell battery pack. Similar to the virgin charge cycle in the single cycle memory embodiment, no information is available concerning previous charge cycles. Therefore, each of the adjustable shunt devices 30*a*–30*n* will provide the maximum current at the charge outputs. The controller 11 initiates the virgin charge cycle by opening the charging source gate 14. At step 302, the controller monitors the charge level of each battery cell through the charge monitor devices 40a–40n. When the charge level of one of the battery cells 34a–34n reaches a maximum threshold value, the virgin charging cycle is terminated and processing continues at step 304.

At step 304, the controller 11 identifies the particular battery cell that triggered the termination of the charge cycle. At step 305, the controller examines the shunt value being applied to the shunting device of the triggering battery cell. If the controller 11 determines that the shunt value for the triggering cell is at its maximum value, then step 307 is entered. Otherwise, processing continues at step 306. In an alternative embodiment, a charge cycle count may be maintained in a memory device. Each charge cycle results in incrementing the charge cycle count. When the charge cycle count reaches a maximum value, Step 307 may be entered.

At step 306, a shunt value is determined for the triggering battery cell. The shunt value may be determined in a variety of methods and the present invention should not be limited to any specific method. In this embodiment, each of the adjustable shunt devices 30a–30n can be set to one of several settings. In addition, the controller maintains a shunt value variable in the memory storage device for each adjustable shunt device 30a–30n. Thus, the shunt values for each adjustable shunt device may be retained over several charge cycles. Once the shunt value is modified for a triggering battery cell, each subsequent charge cycle will utilize that shunt value for that battery cell until that battery cell again becomes the triggering battery cell. At this point, the shunt value for the triggering cell may be increased up to a maximum value. In one embodiment the shunt value for a battery cell may be incremented by a pre-determined amount each time the battery cell triggers the completion of a charge cycle, until the maximum value is reached.

Step 307 is entered when the shunt value variable associated with at least one battery cell has reached its maximum allowed value. The shunt value is limited to this maximum value to avoid requiring larger, more expensive shunting devices. Step 307 illustrates one method to handle this scenario. At step 307, the shunt value variables associated with each of the adjustable shunt devices 30a–30n are set to their minimum value forcing the next charge cycle to be a virgin charge cycle. This is illustrated by returning to step 300 after reducing the shunt value variables. In an alternative embodiment, the shunt value variables of each non-triggering battery cell for the active charge cycle may be reduced by a pre-determined amount. This will result in allowing an alternate battery cell to trigger the termination of the next charge cycle. In another embodiment, during each charge cycle, the shunt values may be calculated in a manner that allows the charge current for each battery cell to reach an equilibrium state. In the equilibrium state, each of the battery cells will charge to be within a certain tolerance of the triggering threshold. Upon detecting that one of the battery cells has charged to the threshold value, if each of the other battery cells are within the threshold tolerance, then no additional adjustments will be required for the next charge cycle.

After determining the shunt value for the triggering battery cell, the battery pack will pass through a discharge cycle prior to initiating a shunted charge cycle at step 308. Step 308 is entered as the result of a charge request 12. At step 308, the controller 11 applies the shunt value, determined in step 306, to the adjustable shunting device of the triggering battery cell as well as the stored shunt values determined in previous charge cycles to the remaining adjustable shunting devices associated with the other battery cells. The controller 11 then initiates a shunted charge cycle by opening the charging source gate 14. At step 310, the controller 11 monitors the charge level of each battery cell during the shunted charge cycle through the charge monitor devices 40a–40n. When the charge level of one of the battery cells 34a–34n reaches a maximum threshold value, the controller 11 terminates the charging cycle and processing returns to step 304.

Returning to step 304, the controller 11 identifies the new shunt value of the battery cell that triggered the termination of the charge cycle. If the shunt value of the new battery cell is at its maximum value at step 305, then processing continues at step 307 as described above. Otherwise, processing continues at step 306. At step 306, a new shunt value is determined for the new triggering battery cell and the controller 11 waits for the next charge request 12. Upon receiving the next charge request 12, if necessary, the controller 11 reloads each of the adjustable shunt devices in accordance with their previous setting and then adjusts the adjustable shunt device connected to the triggering battery cell in accordance with the new shunt value. This process continues for each subsequent shunted charge cycle.

It should be apparent to the reader, that this embodiment of the present invention provides a balanced charging method for a multiple-cell battery pack by cyclically allowing each battery cell to be fully charged. Also, by limiting the shunting device to dissipate 1% to 5% of the full current charging rate, inexpensive shunting devices can be used. This minimizes the cost impact to manufacturing the battery pack. Furthermore, the length of each charge cycle is limited to the length of the charge cycle for the triggering battery cell. If the shunting devices are limited to shunting 1% to 5% of the lull charge current rate, then the length of the charge cycle will only be slightly increased.

From the foregoing description, it will be appreciated that the present invention balances the charge cycle of a multiple-cell battery pack without adversely impacting the life of the battery pack. In addition, the present invention includes a method of charging a multiple-cell battery pack without requiring a shunting device to dissipate a large amount of current.

Although the present invention has been described as alleviating the memory effect problems inherent in some battery technologies, it should be apparent that this method is also applicable with batteries and battery cells that are not affected by this phenomenon. In addition, the present invention has been described in the context of charging and monitoring individual battery cells. It should be apparent that the present invention may be used for charging individual battery cells, individual battery cells connected together as a multiple-cell battery pack, individual batteries consisting of one or more cells each, or individual batteries consisting of one or more cells and connected together as a multiple-battery battery pack. The term "battery unit" is used to refer to a single battery cell or a single battery consisting of one or more cells.

The present invention may be conveniently implemented by using hardware and logic components or a combination of hardware and logic components and one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of hardware configurations and program languages that can be used to practice the instant invention, it is not practical to provide a representative example of a specific hardware design or a program module that would be applicable to these many different configurations.

The present invention has been described in relation to particular embodiments which are intended in all respects to be illustrative rather than restrictive. Those skilled in the art will understand that the principles of the present invention may be applied to, and embodied in, various hardware configurations for various types of battery cells in various types of configurations.

Alternative embodiments will become apparent to those skilled in the art to which the present invention pertains without departing from its spirit and scope. Accordingly, the scope of the present invention is described by the appended claims and supported by the foregoing description.

We claim:

1. A method for balancing the charge cycles for a plurality of battery units, comprising the steps of:
   (a) initiating a charge cycle for simultaneously charging a plurality of battery units at an initial charging rate;
   (b) detecting a triggering battery unit, the triggering battery unit being the first battery unit to be charged to a threshold level;
   (c) terminating the charge cycle;
   (d) initiating a subsequent charge cycle; and
   (e) throughout the subsequent charge cycle, reducing the charging rate for the triggering battery unit by a selected amount.

2. A battery unit charging system for providing a balanced charge cycle for a plurality of battery units, comprising:
   a controller;
   a gating means coupled to the controller for enabling the input of a current;
   a shunting means for receiving the current and in response to input received from the controller, dividing the current between a charge output for driving a terminal of a battery unit, and a shunt output;
   a monitoring means for monitoring the charge level of each battery unit;
   the controller, being operative to:
      (a) initialize the shunting means to divide the current by a first amount between the charge outputs for each of the battery units and the shunt outputs;
      (b) enable the gating means to provide the current to the shunting means for simultaneously charging a plurality of battery units;
      (c) detect a triggering battery unit, the triggering battery unit being the first battery unit that the monitoring means identifies as charging to a threshold level;
      (d) disable the gating means; and
      (e) identify a second amount for the shunting means to divide the current between the charge output and shunt output associated with the triggering battery unit during a next charge cycle.

3. The battery unit charging system of claim 2, wherein each battery unit is a single battery cell.

4. The battery unit charging system of claim 2, wherein each battery unit is a single battery having one or more cells.

5. A charging system for providing a balanced charge cycle for battery packs containing multiple battery units, comprising:
   a controller;
   a current source gate coupled to the controller for enabling the input of a charging current from a charging source;
   a plurality of adjustable shunting devices, each adjustable shunting device being coupled to the controller and the charging source gate, having a charge output connectable to a terminal of a battery unit, and having a shunt output functionally connected to the charging source;
   a plurality of charge monitors, each charge monitor being coupled to the controller and being connectable across the terminals of a battery unit for measuring the charge of the battery unit;
   the controller, being operative to:
      (a) initiate a virgin charge cycle by adjusting each of the adjustable shunting devices in order to maximize the charge output to a connected battery unit, and enabling the input of the charging current by opening the charging source gate;
      (b) identify a triggering battery unit by monitoring each of the charge monitors until the charge of one of the battery units reaches a threshold value;
      (c) in response to identifying a triggering battery unit, close the charging source gate to disable the charging current; and
      (d) determine a shunt value for the adjustable shunting device connected to the triggering battery unit to be used during a subsequent, shunted charge cycle.

6. The charging system of claim 5, wherein the controller is further operative to:
   initiate the shunted charge cycle by adjusting the adjustable shunting device connected to the triggering battery unit in accordance with the shunt value, adjusting each of the adjustable shunting devices connected to the non-triggering battery units in order to maximize the charge output, and enabling the input of the charging source by opening the charging source gate;
   identify a new triggering battery unit by monitoring each of the charge monitors until the charge of one of the battery units reaches a threshold value;
   in response to identifying a new triggering battery unit, close the charging source gate to disable the charging current; and
   determine a new shunt value for the adjustable shunting device connected to the new triggering battery unit to be used during a subsequent, shunted charge cycle.

7. The charging system of claim 6, wherein the controller is operative to determine a shunt value by selecting a shunt value that limits the shunt output of the adjustable shunting devices within a range including 1% to 5% of the maximum charge output.

8. The charging system of claim 6, wherein the controller, the charging source gate, the adjustable shunting devices, and the charger monitors are all incorporated into a single battery pack.

9. The charging system of claim 8, wherein the battery units are single metal-air battery cells.

10. The charging system of claim 6, wherein the battery units are single metal-air battery cells.

11. The charging system of claim 5, wherein the controller is operative to determine a shunt value by selecting a shunt value to limit the shunt output of the adjustable shunting devices within a range including 1% to 5% of the maximum charging output.

12. A charging system for providing a balanced charge cycle for battery units, comprising:
   a controller with a memory storage device;
   a current source gate coupled to the controller for enabling the input of a charging current from a charging source;

a plurality of adjustable shunting devices, each adjustable shunting device being coupled to the controller and the charging source gate, having a charge output connectable to a terminal of a battery unit, and having a shunt output functionally connected to the charging source;

a plurality of charge monitors, each charge monitor being coupled to the controller and being connectable across the terminals of a battery unit for measuring the voltage potential of the battery unit;

the controller, being operative to:

set a shunt value variable in the memory storage device for each adjustable shunting device to a minimum value; and for each requested charge cycle:
adjust each of the adjustable shunting devices in accordance with the shunt value variable;
enable the input of the charging current by opening the charging source gate;
identify a triggering battery unit by monitoring each of the charge monitors until the voltage potential of one of the battery units reaches a threshold value;
in response to identifying a triggering battery unit, disable the charging current by closing the charging source gate;
determine a shunt value for the adjustable shunting device connected to the triggering battery unit; and
store the shunt value into the shunt value variable of the memory storage device corresponding with the triggering battery unit.

13. The charging system of claim 12, wherein the controller is further operative to reset the shunt value variables to the minimum value when one of the shunt value variables reaches a maximum value.

14. The charging system of claim 12, wherein the controller is operative to determine a shunt value by selecting a shunt value that limits the shunt output of the adjustable shunting devices within a range including 1% to 5% of the maximum charge output.

15. The charging system of claim 12, wherein the controller is operative to determine a shunt value by incrementing the current shunt value by a predetermined amount.

16. The charging system of claim 12, wherein the controller, the charging source gate, the adjustable shunting devices, and the charger monitors are all incorporated into a single battery pack.

17. The charging system of claim 12, wherein the battery units are single metal-air battery cells.

18. A method for balancing the charge cycles for a plurality of battery units, comprising the steps of:

in response to receiving a first charge request, initiating a virgin charge cycle, the virgin charge cycle allowing a maximum charge current to be provided to each of the battery units;

terminating the virgin charge cycle when the voltage potential of a first triggering battery unit reaches a threshold value;

determining a first shunt value for the first triggering battery unit;

in response to receiving a second charge request, initiating a first shunted charge cycle, the first shunted charge cycle allowing a maximum charge current to be provided to each of the non-triggering battery units, and a charge current shunted in accordance with the shunt value to be provided to the first triggering battery unit;

terminating the first shunted charge cycle when the voltage potential of a second triggering battery unit reaches the threshold value;

determining a second shunt value for the second triggering battery unit; and in response to receiving a third charge request, initiating a second shunted charge cycle, the second shunted charge cycle allowing a maximum charge current to be provided to each of the non-triggering battery units, and a charge current shunted in accordance with the second shunt value to be provided to the second triggering battery unit.

19. The method of claim 18, wherein the step of determining a shunt value for a triggering battery unit comprises the steps of:

examining the charge level of at least one other battery unit; and selecting a shunt value that ensures at least one other battery unit will charge to the threshold value on a subsequent charge cycle prior to the triggering battery unit charging to the threshold value.

20. The method of claim 18, wherein the step of determining a shunt value for the triggering battery unit comprises the steps of:

examining the voltage potential of at least one other battery unit;

selecting a shunt value based on the examined voltage potentials that ensures at least one other battery unit will charge to the threshold value on a subsequent charge cycle prior to the triggering battery unit charging to the threshold value; and limiting the shunt value to include the range of 1% to 5% of the maximum charge current.

21. The method of claim 18, wherein the step of determining a shunt value for the triggering battery unit comprises the step of setting the shunt value to a fixed value in the range of 1% to 5% of the maximum charge current.

22. A method for balancing the charge cycles for a plurality of battery units, comprising the steps of:

(a) assigning an initial shunt value to each of a plurality of adjustable shunting devices, each adjustable shunting device being associated with one of a plurality of battery units, the initial shunt value being selected to maximum charge current passed to each of the battery units through the adjustable shunting device associated with the battery unit;

(b) activating a charge cycle by enabling a charge current to be provided to the each of the battery units through the adjustable shunting device associated with the battery unit;

(c) terminating the active charge cycle when the charge of a first battery unit reaches a threshold value, and identifying the first battery unit as an active triggering battery unit; and (d) for each subsequent charge cycle:
determining a new shunt value for the active triggering battery unit;
adjusting the adjustable shunting device associated with the active triggering battery unit in accordance with the new shunt value; and
terminating the charge cycle when a next battery unit is charged to a threshold value, and identifying the next battery unit as the active triggering battery unit.

23. The method of claim 22, wherein the step of determining an active shunt value comprises the step of incrementing the shunt value by a predetermined amount.

24. A charging system for providing a balanced charge cycle for battery units, comprising:
- a controller with a memory storage device;
- a current source gate coupled to the controller for enabling the input of a charging current from a charging source;
- a plurality of adjustable shunting, devices, each adjustable shunting device being coupled to the controller and the charging source gate, having a charge output connectable to a terminal of a battery unit, and having a shunt output functionally connected to the charging source;
- a plurality of charge monitors, each charge monitor being coupled to the controller and being connectable across the terminals of a battery unit for measuring the voltage potential of the battery unit; the controller, being operative to:
    - set a shunt value variable in the memory storage device for each adjustable shunting device to a minimum value; and
    - for each requested charge cycle:
        - adjust each ol the adjustable shunting devices in accordance with the shunt value variable;
        - enable the input of the charging current by opening the charging source gate;
        - identify a triggering battery unit by monitoring each of the charge monitors until the voltage potential of one of the battery units reaches a threshold value;
        - in response to identifying a triggering battery unit, disable the charging current by closing the charging source gate;
        - determine a shunt value for the adjustable shunting device connected to the triggering battery unit by examining the voltage potential of at least one other battery unit and selecting a shunt value that ensures at least one other battery unit will charge to the threshold value prior to the triggering battery unit.; and
        - store the shunt value into the shunt value variable of the memory storage device corresponding with the triggering battery unit.

25. A method for balancing the charge cycles for a plurality of battery units, comprising the steps of:
  (a) assigning an initial shunt value to each of a plurality of adjustable shunting devices, each adjustable shunting device being associated with one of a plurality of battery units, the initial shunt value being selected to maximum charge current passed to each of the battery units through the adjustable shunting device associated with the battery unit;
  (b) activating a charge cycle by enabling a charge current to be provided to the each of the battery units through the adjustable shunting device associated with the battery unit;
  (c) terminating the active charge cycle when the charge of a first battery unit reaches a threshold value, and identifying the first battery unit as an active triggering battery unit; and
  (d) for each subsequent charge cycle:
    - determining a new shunt value for the active triggering battery unit by examining the voltage potential of each battery unit and selecting a new shunt value as a function of these voltage potentials and that will allow at least one other battery unit to charge to the threshold value prior to the triggering battery unit;
    - adjusting the adjustable shunting device associated with the active triggering battery unit in accordance with the new shunt value; and
    - terminating the charge cycle when a next battery unit is charged to a threshold value, and identifying the next battery unit as the active triggering battery unit.

* * * * *